R. B. Perkins,
Spoon.

N° 34,863.  Patented Apr. 1, 1862.

Witnesses  Inventor.
Wm. H. Harrison  Russell B. Perkins
E. Kempsmer  by A. Blackman

UNITED STATES PATENT OFFICE.

RUSSELL B. PERKINS, OF MERIDEN, CONNECTICUT, ASSIGNOR TO PARKER & PERKINS, OF SAME PLACE.

IMPROVEMENT IN THE MANUFACTURE OF SPOONS.

Specification forming part of Letters Patent No. 34,863, dated April 1, 1862.

*To all whom it may concern:*

Be it known that I, RUSSELL B. PERKINS, of Meriden, New Haven county, Connecticut, have invented a new and useful Improvement in the Manufacture of Iron Spoons; and I do hereby declare that the following is a full, clear, and exact description of the same, reference being made to the annexed drawings, making a part of this specification, in which similar letters indicate similar parts throughout the figures.

My invention has reference to that kind of iron spoons in which the bowl and the handle are struck out of separate pieces of plate metal and are afterward affixed together by means of riveting or dovetailing in connection with the soldering of the contiguous surfaces by the act of tinning. As commonly made the bowl has been formed of a piece of tin-plate struck into the exact shape required for the interior when finished, and the handle of iron plate has been put onto the outside of this, the parts being both tinned on the surfaces which are to come together. A rivet was then put through both, and when afterward the whole spoon was tinned the two surfaces in contact became united by the flowing of the tin thereon, caused by the heat of the tinning-bath. The bowl of a spoon thus constructed, if made as light as desirable, readily bends just at the side of the line of junction, and, in fact, the weakest portion of the spoon is at that part. The object of my improvement is to give the bowl a form of greater strength, whereby it may resist such bending force, and also to affix the handle more securely, and that I have accomplished both of these to a very considerable degree will be apparent from the following description of my method of construction.

I make the bowl generally in the usual manner; but I strike down at the place where the handle is to be joined a recess on the inner side to receive the end of the handle, and that will therefore be affixed upon the inner side of the metal of the bowl, instead of the outer side, as heretofore.

Figure 1:
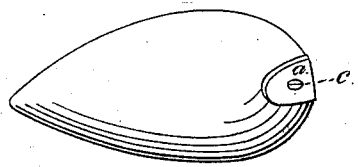
Figure 2:
Figure 3:
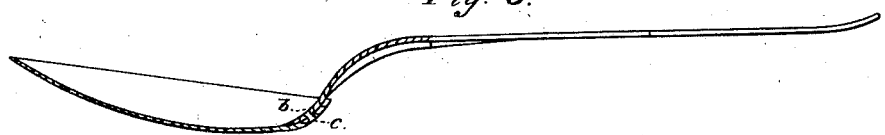

In the annexed drawings, Figure 1 exhibits the bowl separately, having the recess at *a*, and in this the rivet *c* is seen projecting above the surface, being put through from the outside. The handle part is shown in Fig. 2, and this is also generally formed in the usual manner, the part at *b* being made, however, to fit into the recess *a*. The parts are now to be tinned, and, having then been put together and the pin *c* riveted down, as shown in the sectional view, Fig. 3, the spoon is then to be tinned in the ordinary manner, and this effects the soldering of the bowl and handle, as is well known. It will thus be seen that the handle has a bearing upon the bowl along the edges of the part *b*, as well as upon the flat portions, and, as it is made to fit into the recess, it would not turn upon the rivet if the parts were not soldered. The surfaces to be united by the soldering are, however, greater, and hence the spoon is stronger from that cause, while as the bowl at this part is struck out of the line of regular curve it has the form of strength due to the additional angles, as is well known.

I have described the recess as made on the interior of the bowl; but it will be obvious that it may be struck in from the exterior and the handle be affixed on that side. The desired contour of the interior of the bowl would, however, be lost thereby.

I claim—

Forming the recess in the bowl of the spoon for the reception of the handle by swaging the same by means of dies, as set forth.

RUSSELL B. PERKINS.

Witnesses:
J. W. MILES,
CHAS. D. WILLIAMS.